United States Patent
Reed et al.

(10) Patent No.: US 11,640,339 B2
(45) Date of Patent: May 2, 2023

(54) CREATING A BACKUP DATA SET

(71) Applicant: International Business Machines Corporation, Armonk, NY (US)

(72) Inventors: David C. Reed, Tucson, AZ (US); Matthew Barragan, Oracle, AZ (US); Esteban Rios, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 17/102,092

(22) Filed: Nov. 23, 2020

(65) Prior Publication Data

US 2022/0164259 A1 May 26, 2022

(51) Int. Cl.
G06F 11/14 (2006.01)
G06F 3/06 (2006.01)

(52) U.S. Cl.
CPC .......... *G06F 11/1464* (2013.01); *G06F 3/067* (2013.01); *G06F 3/0619* (2013.01); *G06F 3/0659* (2013.01); *G06F 3/0683* (2013.01); *G06F 11/1451* (2013.01); *G06F 11/1461* (2013.01); *G06F 11/1469* (2013.01)

(58) Field of Classification Search
CPC .... G06F 3/0619; G06F 3/065; G06F 11/1451; G06F 16/1744; G06F 11/1464
USPC ........................................................ 711/162
See application file for complete search history.

(56) References Cited

U.S. PATENT DOCUMENTS

| | | | |
|---|---|---|---|
| 5,907,672 A | 5/1999 | Matze et al. | |
| 6,434,681 B1 * | 8/2002 | Armangau | G06F 11/1466 711/202 |
| 6,542,975 B1 | 4/2003 | Evers et al. | |
| 9,619,335 B1 | 4/2017 | Bushman | |
| 10,585,617 B1 | 3/2020 | Colgrove et al. | |
| 2010/0180075 A1 * | 7/2010 | McCloskey | G06F 11/1453 711/E12.001 |
| 2010/0228708 A1 | 9/2010 | Lehr et al. | |

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Oct. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
CSRC, "Cloud Computing," Computer Security Resource Center, Oct. 2017, 3 pages, retrieved from https://csrc.nist.gov/projects/cloud-computing.

\* cited by examiner

*Primary Examiner* — Than Nguyen
(74) *Attorney, Agent, or Firm* — Zilka-Kotab, P.C.

(57) ABSTRACT

A computer-implemented method according to one embodiment includes identifying a first data set to be backed up, where the first data set is stored on a first storage volume; removing empty data tracks from the first data set to create an intermediary data set; storing the intermediary data set at a plurality of secondary storage volumes different from the first storage volume; and creating a backup data set for the first data set, utilizing the intermediary data set.

20 Claims, 7 Drawing Sheets

CREATING A BACKUP DATA SET

BACKGROUND

The present invention relates to data replication, and more particularly, this invention relates to creating a backup of a data set.

Backing up data is a valuable way to protect such data from undesirable occurrences such as accidental deletion, hardware failure, malware, etc. However, current methods for backing up a data set within a storage volume necessitate the copying of an entirety of the data set, including empty data tracks, and storing an intermediary data set only on a single secondary storage volume. It is therefore desirable to improve the functionality and efficiency of such backup methods.

BRIEF SUMMARY

A computer-implemented method according to one embodiment includes identifying a first data set to be backed up, where the first data set is stored on a first storage volume; removing empty data tracks from the first data set to create an intermediary data set; storing the intermediary data set at a plurality of secondary storage volumes different from the first storage volume; and creating a backup data set for the first data set, utilizing the intermediary data set.

According to another embodiment, a computer program product for creating a backup data set includes a computer readable storage medium having program instructions embodied therewith, where the computer readable storage medium is not a transitory signal per se, and where the program instructions are executable by a processor to cause the processor to perform a method including identifying, by the processor, a first data set to be backed up, where the first data set is stored on a first storage volume; removing, by the processor, empty data tracks from the first data set to create an intermediary data set; storing, by the processor, the intermediary data set at a plurality of secondary storage volumes different from the first storage volume; and creating, by the processor, a backup data set for the first data set, utilizing the intermediary data set.

According to another embodiment, a system includes a processor; and logic integrated with the processor, executable by the processor, or integrated with and executable by the processor, where the logic is configured to identify a first data set to be backed up, where the first data set is stored on a first storage volume; remove empty data tracks from the first data set to create an intermediary data set; store the intermediary data set at a plurality of secondary storage volumes different from the first storage volume; and create a backup data set for the first data set, utilizing the intermediary data set.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of creating a backup data set.

In one general embodiment, a computer-implemented method includes identifying a first data set to be backed up, where the first data set is stored on a first storage volume; removing empty data tracks from the first data set to create an intermediary data set; storing the intermediary data set at a plurality of secondary storage volumes different from the first storage volume; and creating a backup data set for the first data set, utilizing the intermediary data set.

In another general embodiment, a computer program product for creating a backup data set includes a computer readable storage medium having program instructions embodied therewith, where the computer readable storage medium is not a transitory signal per se, and where the program instructions are executable by a processor to cause the processor to perform a method including identifying, by the processor, a first data set to be backed up, where the first data set is stored on a first storage volume; removing, by the processor, empty data tracks from the first data set to create an intermediary data set; storing, by the processor, the intermediary data set at a plurality of secondary storage volumes different from the first storage volume; and creating, by the processor, a backup data set for the first data set, utilizing the intermediary data set.

In another general embodiment, a system includes a processor; and logic integrated with the processor, executable by the processor, or integrated with and executable by the processor, where the logic is configured to identify a first data set to be backed up, where the first data set is stored on a first storage volume; remove empty data tracks from the first data set to create an intermediary data set; store the intermediary data set at a plurality of secondary storage volumes different from the first storage volume; and create a backup data set for the first data set, utilizing the intermediary data set.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
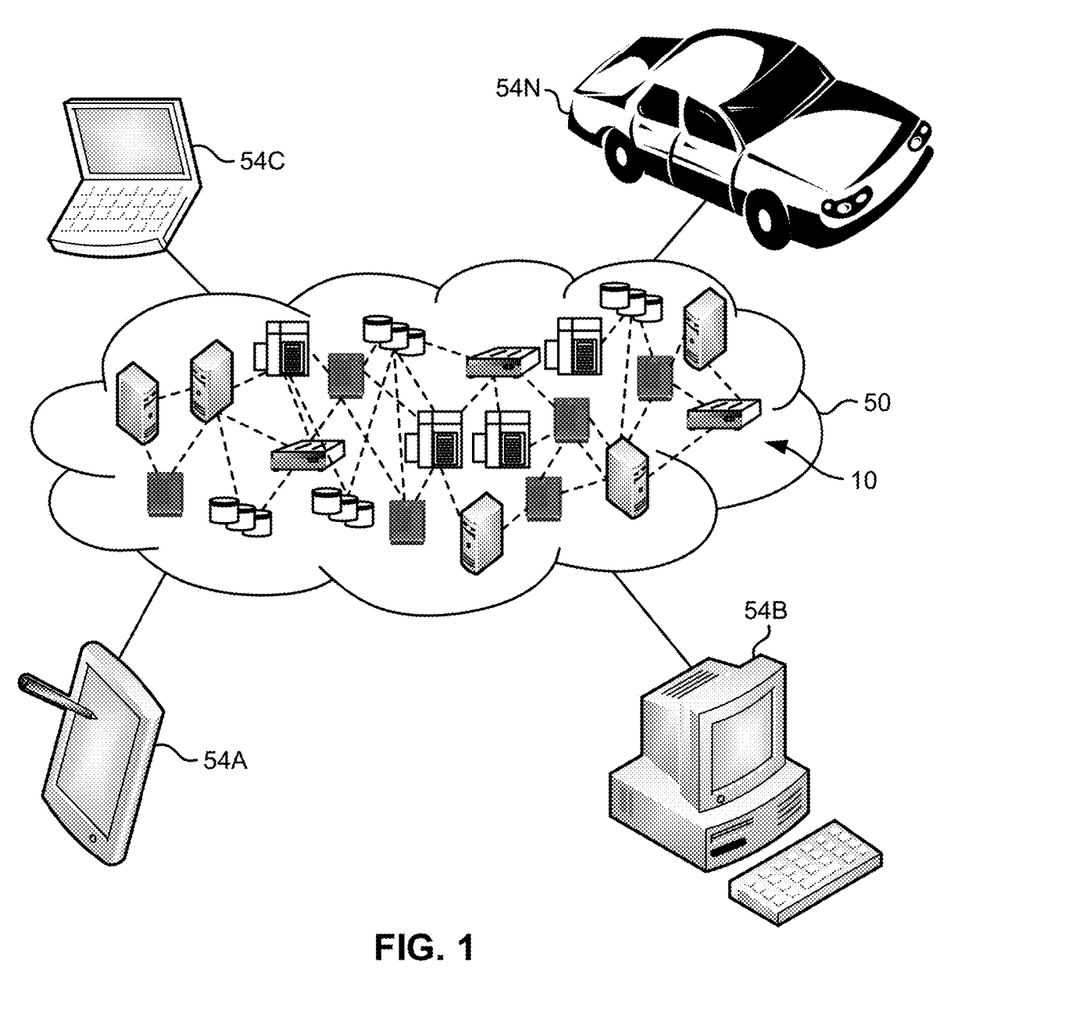
FIG. 1 depicts a cloud computing environment in accordance with one embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
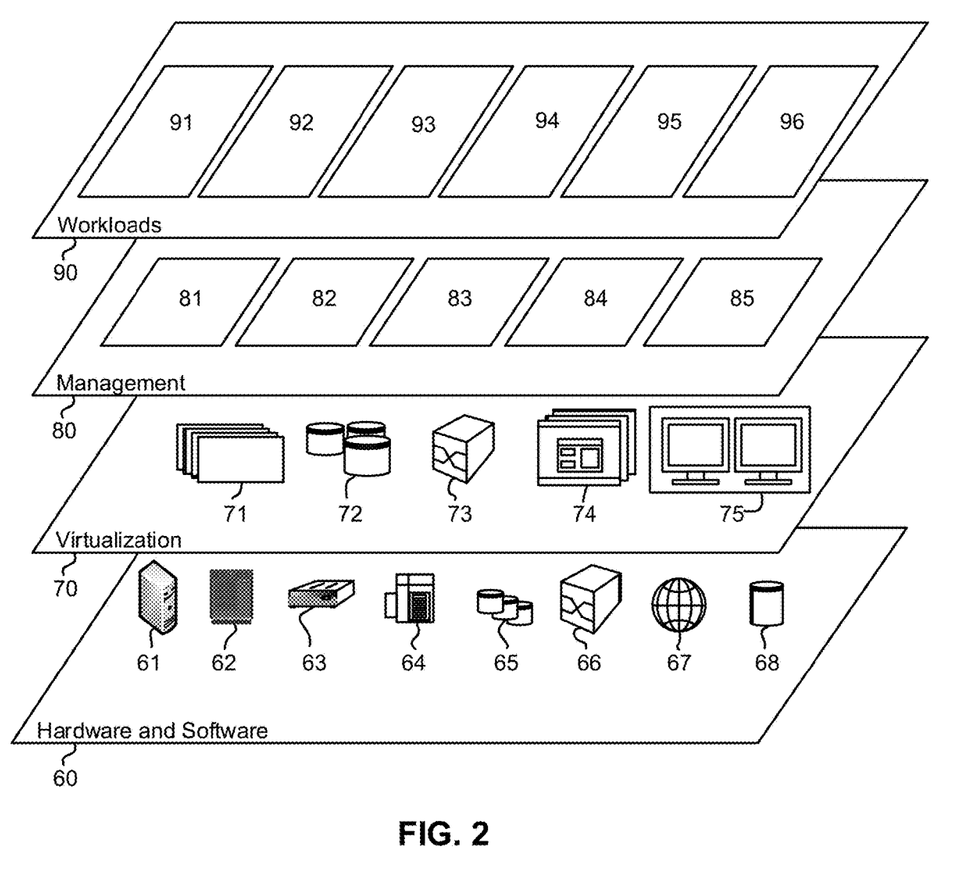
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data replication 96.

Figure 3:
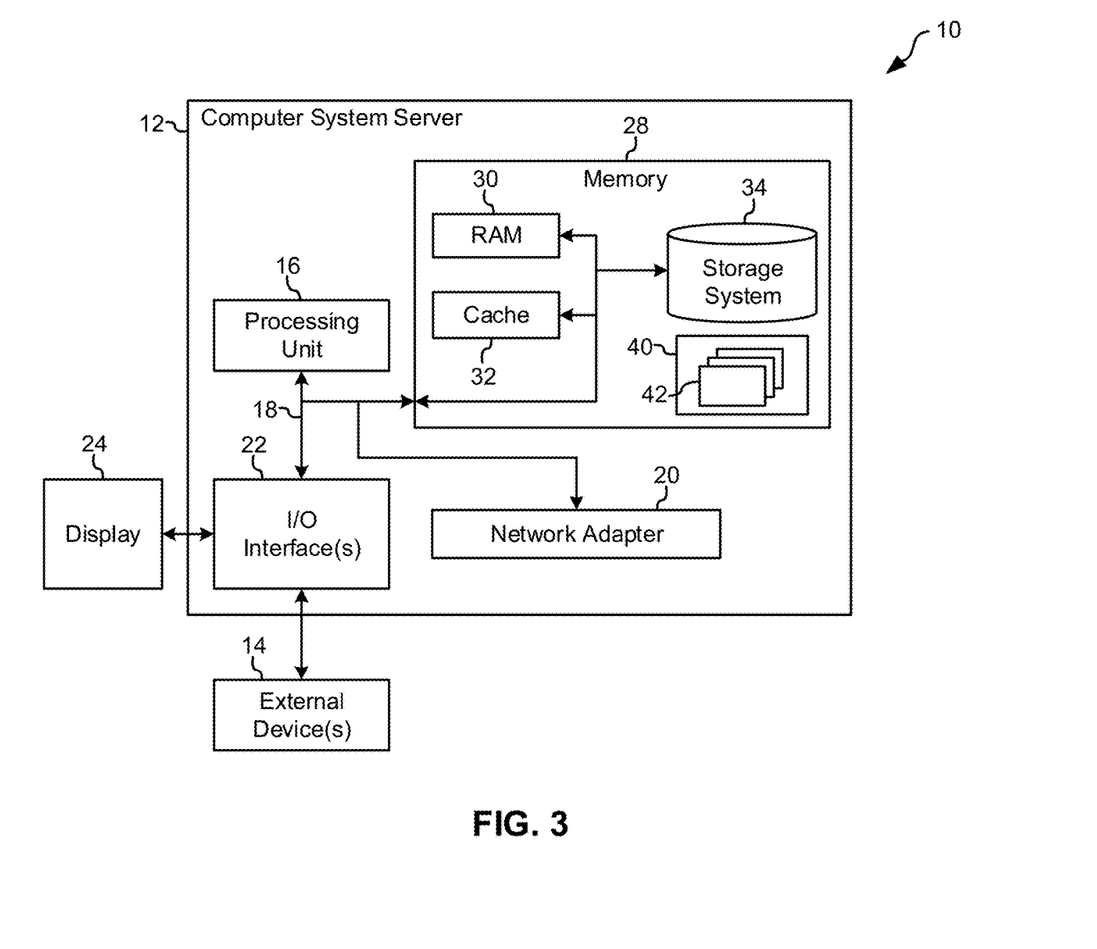
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
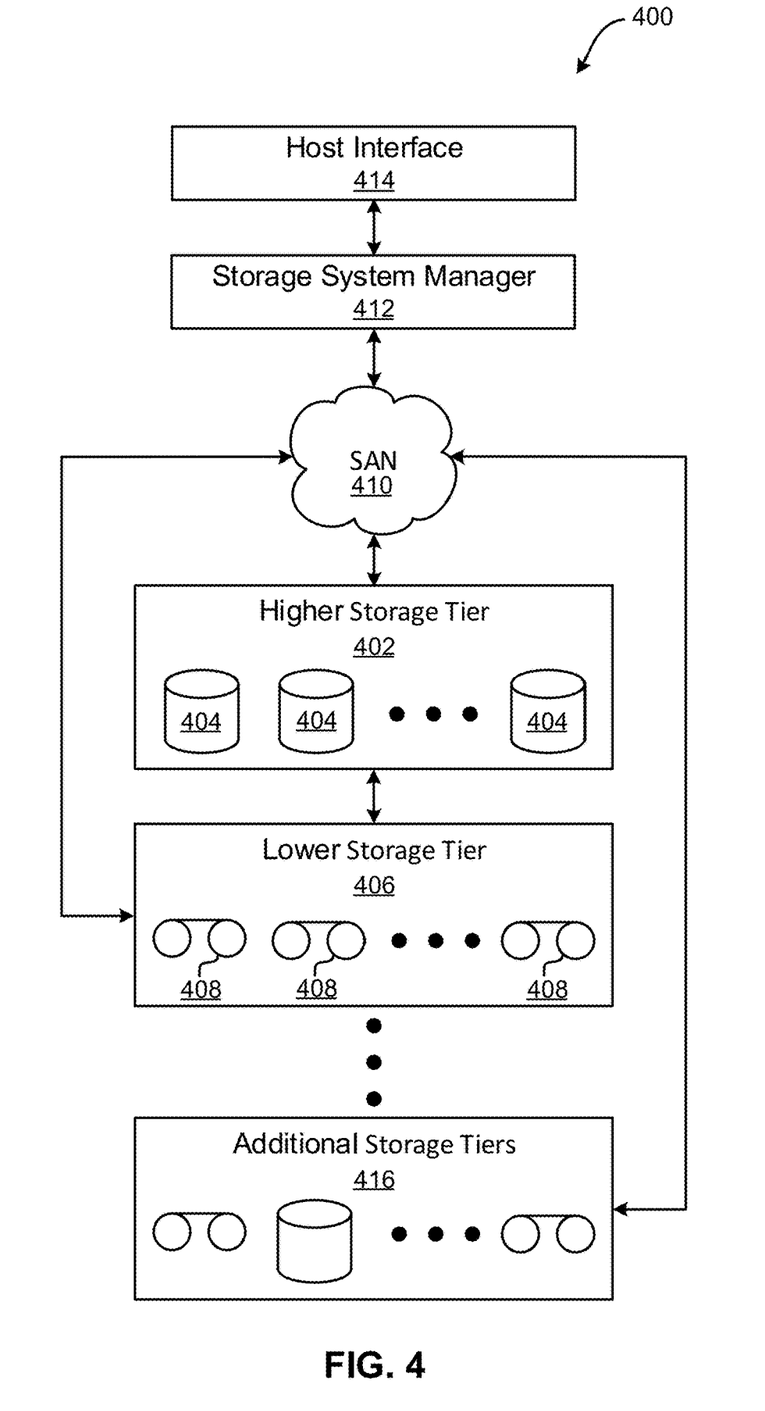
FIG. 4 illustrates a tiered data storage system in accordance with one embodiment of the present invention.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
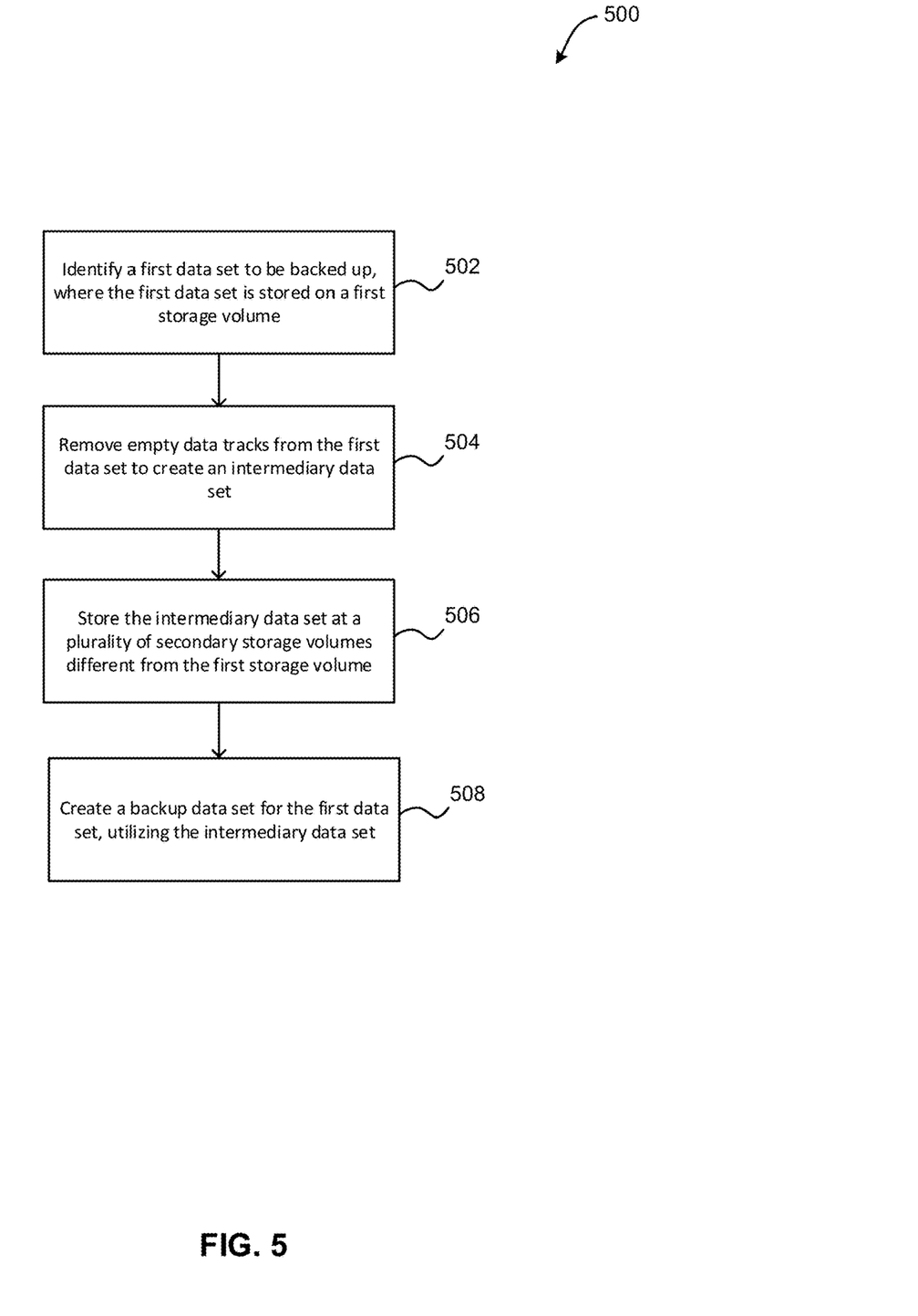
FIG. 5 illustrates a flowchart of a method for creating a backup data set, in accordance with one embodiment of the present invention.

Now referring to FIG. 5, a flowchart of a method 500 is shown according to one embodiment. The method 500 may be performed in accordance with the present invention in any of the environments depicted in FIGS. 1-4 and 6-7, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a first data set to be backed up is identified, where the first data set is stored on a first storage volume. In one embodiment, the first data set may include the entirety of the first storage volume (e.g., all data stored within all data tracks of the first storage volume). In another embodiment, the first data set may include a portion (e.g., one or more specific data cylinders, etc.) of the first storage volume.

Additionally, in one embodiment, the first storage volume may include a single accessible storage area within a single file system. For example, the first storage volume may include the entirety of a single partition of a hard disk or other storage drive. In another embodiment, the first storage volume may be located within a node of a multi-node network. For example, the first storage volume may include a storage node within a multi-node distributed storage network, within a cloud computing network, etc.

Further, in one embodiment, the first data set may be identified in response to a request to back up the first data set. For example, the request may include a request to perform a full volume dump (e.g., a request to back up an entirety of the first storage volume, etc.). In another example, the request may be sent from an application running on the first storage volume, or an application running on another storage volume or computing device in communication with the first storage volume, etc. In yet another example, the request may be received at the first storage volume, at another storage volume or computing device in communication with the first storage volume, etc.

Further still, method 500 may proceed with operation 504, where empty data tracks are removed from the first data set to create an intermediary data set. In one embodiment, the first data set may be parsed at the first storage volume. In another embodiment, the results of the parsing may include an identification of free (e.g., empty) tracks within the first data set, as well as filled tracks (e.g., tracks that currently store data).

Also, in one embodiment, the free data tracks may be empty (e.g., the free data tracks may not currently store data). In another embodiment, each of the filled tracks may be copied to the intermediary data set (e.g., as track images, etc.). In yet another embodiment, none of the empty tracks may be copied to the intermediary data set. In this way, the intermediary data set may include a copy of all data stored within the first data set, with all empty tracks removed/stripped.

In addition, in one embodiment, a bitmap may be added to the intermediary data set to identify a location of free tracks and filled tracks within the first data set. For example, each bit of the bitmap may represent a track within the first data set. In another example, the location of bits within the bitmap represents the locations of corresponding tracks within the first data set.

Furthermore, in one example, a first bit value (e.g., zero, etc.) may be used to indicate that a corresponding track within the first data set is free at the time of the backup. In another example, a second bit value (e.g., zero, etc.) may be used to indicate that a corresponding track within the first data set is filled at the time of the backup. In yet another example, assigning a value of one to a first bit within the bitmap may indicate that a first track within the first data set is filled with data. In still another example, assigning a value of zero to a second bit within the bitmap may indicate that a second track within the first data set is empty.

In this way, the bitmap may enable the restoration of all tracks (both filled tracks and empty tracks) at the first storage volume, utilizing a condensed version of the first data set (e.g., the intermediary data set). The intermediary data set may also be called a dump condition target, a dump condition data set, etc.

Further still, method 500 may proceed with operation 506, where the intermediary data set is stored at a plurality of secondary storage volumes different from the first storage volume. In one embodiment, the intermediary data set may be divided into a plurality of portions. In another embodiment, each portion may be stored at one of the plurality of secondary storage volumes, such that each of the plurality of secondary storage volumes stores a portion different from the portion stored at the other secondary storage volumes.

Also, in one embodiment, the intermediary data set may be created and stored at the plurality of secondary storage volumes simultaneously. For example, as the intermediary data set is being created, it may be stored at the plurality of secondary storage volumes. In another embodiment, an entry may be created within a catalog that identifies which of the plurality of secondary storage volumes stores each portion of the intermediary data set.

Additionally, in one embodiment, the created catalog entry may identify a location of specific tracks of the intermediary data set within the plurality of secondary storage volumes. In another embodiment, the created catalog entry may be stored at the first storage volume, at another storage volume or computing device in communication with the first storage volume, etc. In yet another embodiment, the created catalog entry may indicate that the plurality of portions of the intermediary data set constitute a dump condition volume.

Further, in one embodiment, one or more of the plurality of secondary storage volumes may also store all or a portion of another intermediary data set (e.g., another intermediary data set that is different from the intermediary data set and that is created from another data set different from the first data set). In another embodiment, the bitmap may be stored with a first portion of the plurality of portions of the intermediary data set.

Further still, in one embodiment, a hold/lock may be placed on the first data set within the first storage volume when the intermediary data set is created and stored at the plurality of secondary storage volumes. For example, when the hold/lock is placed, the first data set may not be changed within the first storage volume. In another embodiment, after the intermediary data set is created and stored at the plurality of secondary storage volumes, the hold/lock may be released. For example, when the hold/lock is placed, the first data set may be changed within the first storage volume.

Also, method 500 may proceed with operation 508, where a backup data set is created for the first data set, utilizing the intermediary data set. In one embodiment, the backup data set may be created and stored at a target storage device separate from the first storage volume and the secondary storage volumes. In another embodiment, the target storage device may include a tape drive, a hard disk drive, etc.

In addition, in one embodiment, the intermediary data set may include the bitmap and a plurality of track images corresponding to filled tracks within the first data set. In another embodiment, the intermediary data set may be read from the plurality of secondary storage volumes and written to the target storage device to create the backup data set. The bitmap within the intermediary data set may be used as a guide to create a mirror image of the first data set as the backup data set (e.g., where the backup data set includes all filled and empty tracks within the first data set, etc.). For example, the bitmap may indicate when a free data track is to be created within the backup data set, when a filled data track is to be read from the plurality of secondary storage volumes and written to the backup data set, etc.

In yet another embodiment, header files may be constructed for the intermediary data set and added to the data from the intermediary data set as the intermediary data set is written to the target storage device. For example, the header files may include metadata indicating one or more features of the intermediary data set (e.g., a type of the data set, a time of a creation of the data set, a time the data set was last backed up, etc.).

Furthermore, in one embodiment, the intermediary data set may be compressed to create the backup data set. In another embodiment, the backup data set may include the bitmap of the intermediary data set and the condensed version of the first data set (e.g., the intermediary data set). In yet another embodiment, the backup data set may include a mirror image of the first data set. For example, the backup data set may include all filled and empty tracks within the first data set, in the same order as the first data set.

Further still, in one embodiment, in response to determining that the backup data set has been created, the intermediary data set may be freed/deleted/removed from the plurality of secondary storage volumes. In another embodiment, the backup data set may also be called a dump data set.

Also, in one embodiment, a failure of the first storage volume may be identified. For example, the first storage volume may fail due to one or more of hardware failure, software failure, malware, etc. In another embodiment, the first data set may be restored on the first storage volume, utilizing the backup data set. For example, if the backup data set includes the bitmap of the intermediary data set and the condensed version of the first data set (e.g., the intermediary data set), the bitmap may be used to restore the first data set on the first storage volume.

For example, filled data tracks may be transferred from the condensed version of the data set, and empty data tracks may be created, at the first storage volume according to the order indicated by the bitmap to recreate the first data set at the first storage volume. In another example, if the backup data set includes a mirror image of the first data set, the backup data set may be transferred to the first storage volume to recreate the first data set at the first storage volume.

In this way, during a data backup of the first data set, the plurality of secondary storage volumes may be used to store an intermediate representation of the first data set (e.g., the intermediary data set), where this intermediate representation may be quickly created and stored in order to minimize a time in which a hold/lock is placed on the first data set. Unused storage space (e.g., free data tracks) within the first data set may be removed from the intermediate representation, thereby reducing an amount of data needed to be stored during the data backup, which improves a performance of computing hardware used to perform such data storage.

Additionally, the intermediate representation may be divided and distributed among a plurality of different secondary storage volumes, which may avoid a requirement to store an entire intermediate representation on a single secondary storage volume. This may enable the storage of multiple portions of different data sets within a single secondary storage volume, which may improve a performance of the secondary storage volumes, as well as computing hardware implementing those secondary storage volumes. This may enable the efficient creation of a snapshot of a data set for a storage volume for purposes of performing a point-in-time backup of the data set that may be used to restore the data set in response to a failure of the storage volume.

Figure 6:
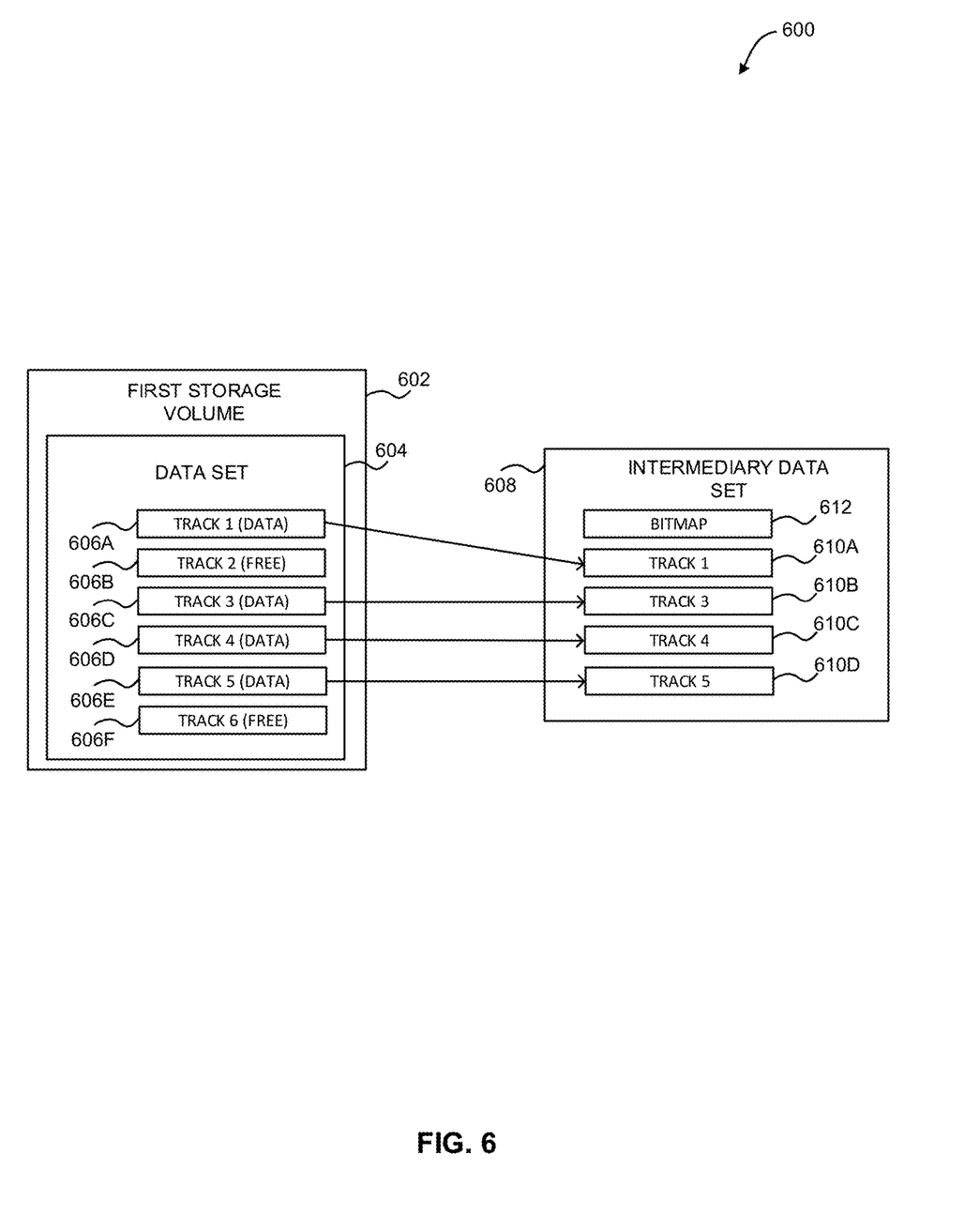
FIG. 6 illustrates an exemplary intermediary data set creation environment, in accordance with one embodiment of the present invention.

FIG. 6 illustrates an exemplary intermediary data set creation environment 600, according to one exemplary embodiment. As shown, a first data set 604 of a first storage volume 602 is identified to be backed up. In one embodiment, the first data set 604 may be one of a plurality of data sets within the first storage volume. In another embodiment, the first data set 604 may be identified in response to a request to back up the first data set 604.

Additionally, in response to the identification of the first data set 604 to be backed up, filled tracks 606A, 606C, 606D, and 606E within the first data set 604 are identified as being filled tracks (e.g., tracks that currently store data, etc.), and empty tracks 606B and 606F are identified as being empty tracks (e.g., tracks that do not currently store data, etc.). The tracks 606A-F may be identified by requesting a status of each of the tracks 606A-F, by attempting a data read from each of the tracks 606A-F, etc.

Further, only filled tracks 606A, 606C, 606D, and 606E are copied to create filled track copies 610A-D, and the filled track copies 610A-D are used to create an intermediary data set 608. Further still, a bitmap 612 is created to identify a status of each track 606A-F within the first data set 604.

More specifically, the bitmap 612 includes a number of bits corresponding to a number of total tracks 606A-F within the first data set 604. The bitmap 612 starts with a bit representing the first track 606A within the first data set 604 and includes a bit representing each track (both filled and empty) within the first data set 604, concluding with a bit representing the last track 606F within the first data set 604.

Also, a value of each bit within the bitmap 612 indicates whether the corresponding track is filled or empty. For example, a bit value of one may indicate that the corresponding track is filled, and a bit value of zero may indicate that the corresponding bit is empty. Using this method, the bitmap 612 for the first data set 604 may include the following data:

101110

In addition, the bitmap 612 is prepended to the filled track copies 610A-D of the intermediary data set 608. In this way, the intermediary data set 608 may enable the restoration of all tracks 606A-F (both filled tracks 606A, 606C, 606D, and 606E and empty tracks 606B and 606F) at the first storage volume 602, utilizing a condensed version of the first data set (e.g., the intermediary data set 608). This may reduce an amount of space needed to store the intermediary data set 608, which may improve a performance of hardware implementing such data storage.

Figure 7:
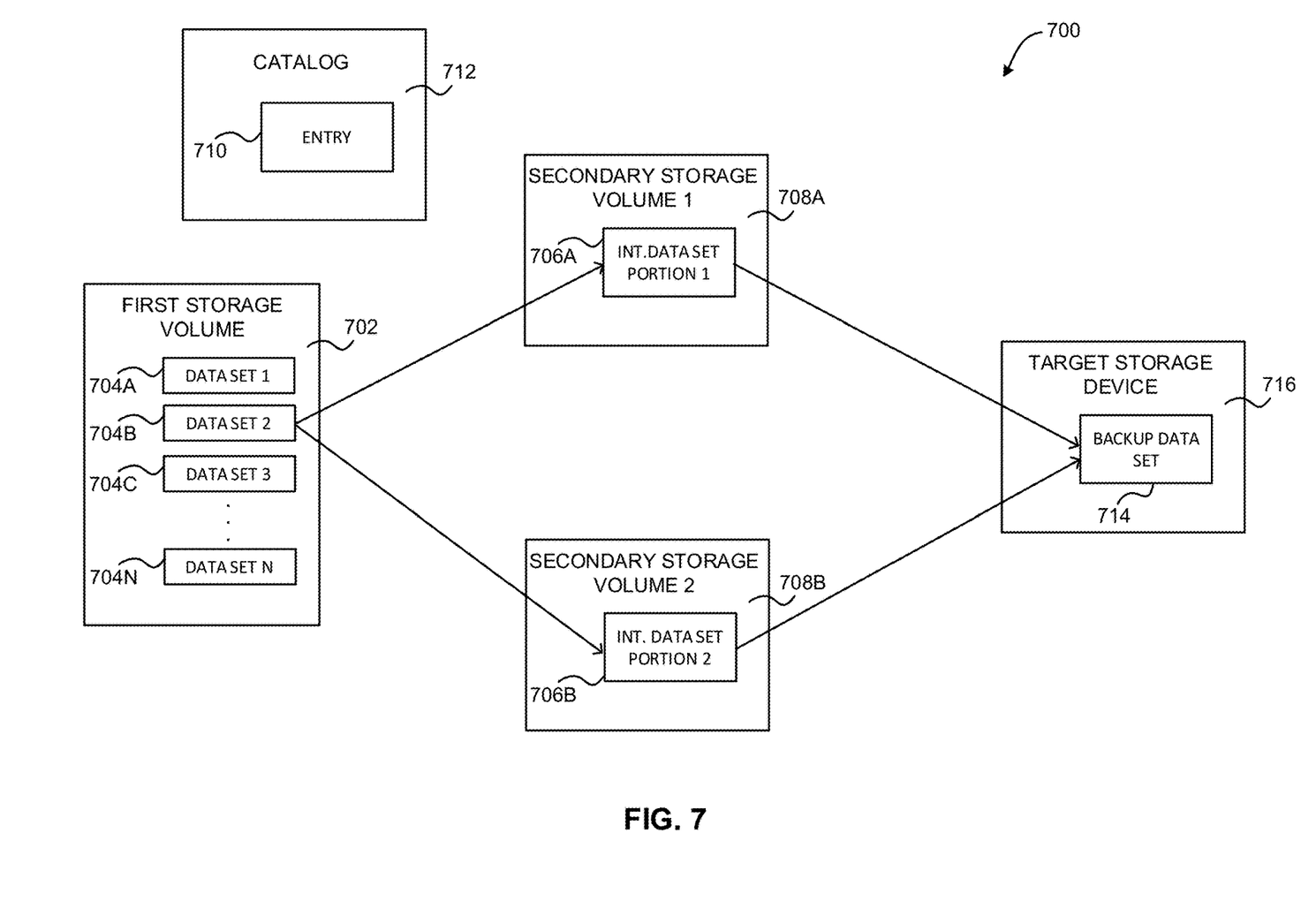
FIG. 7 illustrates an exemplary volume copy environment, in accordance with one embodiment of the present invention.

FIG. 7 illustrates an exemplary volume copy environment 700, according to one exemplary embodiment. As shown, a first storage volume 702 includes a plurality of data sets 704A-N. In response to a request to back up a second data set 704B, an intermediate data set is first created from the second data set 704B (e.g., in the manner shown above in FIG. 6, etc.).

Additionally, the intermediate data set is split into a first portion 706A and a second portion 706B. Although only two portions 706A and 706B are shown, the intermediate data set may be split into more than two portions (e.g., N portions, where N is an integer). The first portion 706A of the intermediate data set may include a bitmap indicating whether each track of the second data set 704B is full or empty.

Also, the first portion 706A of the intermediate data set is stored within a first secondary storage volume 708A, and the second portion 706B of the intermediate data set is stored within a second secondary storage volume 708B. Each of these secondary storage volumes 708A and 708B may store one or more portions of intermediate data sets for additional data sets of the first storage volume (e.g., the first data set 704A, the Nth data set 704N, etc.).

Further, an entry 710 is created within a catalog 712 that identifies the location of the first portion 706A of the intermediate data at the first secondary storage volume 708A, and the location of the second portion 706B of the intermediate data set at the second secondary storage volume 708B. The catalog 712 may be stored within the first storage volume 702, within another storage volume or computing node of a distributed storage system, within a separate computing device, etc.

Further still, a lock/hold may be placed on the second data set 704B at the first storage volume 702 when the first portion 706A of the intermediate data set is stored within the first secondary storage volume 708A, and the second portion 706B of the intermediate data set is stored within the second secondary storage volume 708B. Once storage of the first portion 706A of the intermediate data set is completed at the first secondary storage volume 708A, and storage of the second portion 706B of the intermediate data set is completed at the second secondary storage volume 708B, the lock/hold may be removed from the second data set 704B at the first storage volume 702.

Also, a backup data set 714 is created at a target storage device 716 from the first portion 706A of the intermediate data set and the second portion 706B of the intermediate data set. The target storage device 716 may include a tape drive, a hard disk drive, etc. The backup data set 714 may include a mirror image of the second data set 704B, or the backup data set 714 may include the intermediate data set with the associated bitmap. Either implementation enables the backup data set 714 to be used to restore the second data set 704B in response to determining that the second data set 704B is lost or damaged at the first storage volume 702.

Conditioned Volume Virtualization with Reduced Flash Copy

Today when clients perform a full volume data dump they can use an option that conditions the volume were it is first flash copied to another volume but the volume table of contents (VTOC) and VVDS appear as if they still exist on the original volume. However, there are several limitations to current implementations. For example, to use this function the target volume of the flash copy must be the same size or larger than the original volume and the COPY FULL operation overwrites everything on the target volume. A methodology is therefore needed which allows for conditioned data dumps to be virtually allocated on several volumes. In addition, it is desirable to avoid a required direct access storage device (DASD) space allocation and the flash copying of empty tracks on the volume. Finally, it would be beneficial to eliminate a size restriction of a target volume and allow the target volume to store other data sets that would not be overwritten by the data dump conditioning flash copy operation.

In one embodiment, space is allocated wherever it is available in the storage group as if the request for the flash copy was for a single large data set rather than a full volume copy. This space can be allocated on a single large volume if available or spread across many different volumes. New information will be stored in the catalog and used by dump processing to access the different areas of allocated space where the flash copy is targeted. When this data is read from the flash copy target and written to the dump data set, it is processed in the correct order using the information in the catalog and a translation bitmap to identify the location of that data. In addition, a method is provided that allows for empty tracks on the source volume to not be flash copied to the conditioned target copy volume. It does this by adding logic to the dump processing path to adjust the values in the bitmap to reconstitute the original CCHH value.

Rather than using the entirety of a conditioned target volume, a catalog entry for the dump conditioned data set is used to identify the source volume serial number (VOLSER). The catalog entry contains a bit indicating that the associated volume is a dump conditioned volume and not a normal data set. The bitmap is created during a COPY full operation with a DUMPCONDITIONING operation of the source volume. The bitmap uses bits to represent every track on the volume. A value of one indicates a track was copied and a value of zero indicates the track was skipped. The source volume is processed sequentially starting at cylinder zero, track zero (cyl0 trk0) and processing is performed track by track until the end of the volume. The COPY operation saves the created bitmap in the first cylinder of the target data set (e.g., as a dump conditioned data set).

Currently, all tracks are copied from the source volume to the dump conditioned volume. In one embodiment, only the actual tracks that contain data are flash copied to the dump conditioned data set. From/to blocks are built which represent the tracks that have data and the target area they are going to be flashed to. This skips areas with no data. This can greatly reduce the size of the target space required to hold the conditioned volume. It also reduces the amount of tracks the flash copy operation has to process. The bitmap still represents the original volume that is being copied to the conditioned data set. However, because tracks marked with a zero in the bitmap that have no data are not dumped to the backup, there is no point in moving those tracks to the conditioned data set. Logic is added in dump processing to adjust the CCHH value of the track being dumped to account for those tracks that were removed from the conditioned volume.

During DUMP processing the data mover checks the catalog entry of the data set for a flag indicating if the data set is a dump conditioned data set. If the flag is set as active, then the source volume and the bitmap in the first cylinder is read in and saved for restore processing. Afterwards, all the tracks are copied from the dump conditioned data set to the dump data set. As each data set is processed, header information is recorded on the dump data set that contains the original CCHH value for that track.

Currently, the CCHH written to the dump data set is exactly as it is on the volume being dumped. However, with a conditioned data set, the CCHH may need to be adjusted to account for the empty tracks that are removed. This is done by keeping a count of how many empty tracks were skipped prior to the location of a track. For example, a track may be track 900 in the dump data set, but 300 empty tracks were skipped prior to reaching the 900th relative track. Those 300 tracks that were skipped may be added to the relative track location to adjust the relative track location so the CCHH value written to the dump data set represents the true location of this track from the original volume. When the track is written to the dump data set, it then has a value of 900+300, or a CCHH value that would represent the 1200th track of the volume.

This process is repeated for every track that is dumped. The count of empty skipped tracks is incremented while progressing through the bitmap and dumping tracks from the conditioned data set.

When the dump processing completes, the volume backup that is created looks identical to the volume backups created using the earlier methods that required the dumped track to have the same location on the volume during the conditioning process. Since the backup is identical to those made prior to the invention, the restore process does not require any changes to process those volume backups.

In one embodiment, a method is provided for enabling conditioned data dumps to be virtually allocated on several storage volumes, the method including allocating space wherever it is available in a storage group as if the request for a flash copy was for a single large data set rather than a full volume copy; storing new information in the catalog for use by data dump processing to access the different areas of allocated space where the flash copy is targeted; and processing data in the correct order when reading the data from the flash copy target and writing the data to the dump data set, using information in the catalog and a translation bitmap to identify the location of that data.

Additionally, in one embodiment, the method further includes enabling empty tracks on the source volume to not be flash copied to the conditioned target copy volume by adding logic to the dump processing path to adjust the values in the bitmap and reconstituting the original CCHH value.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying a first data set to be backed up, where the first data set is stored on a first storage volume;
   removing empty data tracks from the first data set to create an intermediary data set;
   storing the intermediary data set at a plurality of secondary storage volumes different from the first storage volume;
   creating a backup data set for the first data set, utilizing the intermediary data set; and
   removing the intermediary data set from the plurality of secondary storage volumes in response to determining that the backup data set has been created.

2. The computer-implemented method of claim 1, comprising: adding a bitmap to the intermediary data set to identify a location of free tracks and filled tracks within the first data set.

3. The computer-implemented method of claim 1, wherein the intermediary data set is divided into a plurality of portions, and each of the plurality of portions is stored at a respective one of the plurality of secondary storage volumes.

4. The computer-implemented method of claim 3, comprising: creating an entry within a catalog that identifies which of the plurality of secondary storage volumes stores a respective one of the plurality of portions of the intermediary data set.

5. The computer-implemented method of claim 1, wherein one or more of the plurality of secondary storage volumes also stores all or a portion of another intermediary data set.

6. The computer-implemented method of claim 1, comprising:
   placing a lock on the first data set within the first storage volume when the intermediary data set is created and stored at the plurality of secondary storage volumes; and
   releasing the lock on the first data set within the first storage volume after the intermediary data set is created and stored at the plurality of secondary storage volumes.

7. The computer-implemented method of claim 1, wherein the backup data set is created and stored at a target storage device separate from the first storage volume and the secondary storage volumes.

8. The computer-implemented method of claim 1, comprising: constructing header files for the intermediary data set, and adding the header files to data from the intermediary data set, as the intermediary data set is written to a target storage device.

9. The computer-implemented method of claim 1, comprising:
   identifying a failure of the first storage volume; and
   restoring the first data set on the first storage volume, utilizing the backup data set.

10. The computer-implemented method of claim 1, comprising: adding a bitmap to the intermediary data that identifies a location of the empty data tracks within the first data set,
    wherein each bit of the bitmap represents a track within the first data set, and a location of bits within the bitmap represents a location of corresponding tracks within the first data set.

11. The computer-implemented method of claim 1, comprising: parsing the first data set at the first storage volume, wherein results of the parsing include an identification of the empty data tracks from the first data set.

12. The computer-implemented method of claim 1, wherein the intermediary data set includes a copy of all data stored within the first data set, with all empty tracks removed.

13. The computer-implemented method of claim 1, comprising:
    parsing the first data set at the first storage volume, wherein results of the parsing include an identification of the empty data tracks from the first data set;
    adding a bitmap to the intermediary data that identifies a location of the empty data tracks within the first data set, wherein each bit of the bitmap represents a track within the first data set, and a location of bits within the bitmap represents a location of corresponding tracks within the first data set;
    dividing the intermediary data set into a plurality of portions;
    storing each of the portions at a respective one of the plurality of secondary storage volumes; and
    creating a catalog with entries identifying which of the plurality of secondary storage volumes stores a respective one of the portions of the intermediary data set.

14. A computer program product, the computer program product comprising one or more computer readable storage media, and program instructions collectively stored on the one or more computer readable storage media, the program instructions comprising instructions configured to cause one or more processors to perform a method comprising:

identifying, by the one or more processors, a first data set to be backed up, where the first data set is stored on a first storage volume;

removing, by the one or more processors, empty data tracks from the first data set to create an intermediary data set;

storing, by the one or more processors, the intermediary data set at a plurality of secondary storage volumes different from the first storage volume;

creating, by the one or more processors, a backup data set for the first data set, utilizing the intermediary data set; and deleting, by the one or more processors, the intermediary data set from the plurality of secondary storage volumes in response to determining that the backup data set has been created.

15. The computer program product of claim 14, the program instructions comprising instructions configured to cause one or more processors to perform the method comprising: adding, by the one or more processors, a bitmap to the intermediary data set to identify a location of free tracks and filled tracks within the first data set.

16. The computer program product of claim 14, wherein the intermediary data set is divided into a plurality of portions, and each of the portions is stored at a respective one of the plurality of secondary storage volumes; and the program instructions comprising instructions configured to cause one or more processors to perform the method comprising: comprising creating, by the one or more processors, an entry within a catalog that identifies which of the plurality of secondary storage volumes stores a respective one of the portions of the intermediary data set.

17. A system, comprising:

a processor; and logic integrated with the processor, executable by the processor, or integrated with and executable by the processor, the logic being configured to:

identify a first data set to be backed up, where the first data set is stored on a first storage volume;

remove empty data tracks from the first data set to create an intermediary data set;

store the intermediary data set at a plurality of secondary storage volumes different from the first storage volume;

create a backup data set for the first data set, utilizing the intermediary data set; and delete the intermediary data set from the plurality of secondary storage volumes in response to determining that the backup data set has been created.

18. The system of claim 17, the logic being configured to:
divide the intermediary data set into a plurality of portions, wherein each of the portions is stored at a respective one of the secondary storage volumes.

19. The system of claim 18, the logic being configured to:
create an entry within a catalog that identifies which of the plurality of secondary storage volumes stores a respective one of the plurality of portions of the intermediary data set.

20. The system of claim 17, the logic being configured to:
add a bitmap to the intermediary data set to identify a location of free tracks and filled tracks within the first data set.

* * * * *